Figure 1:
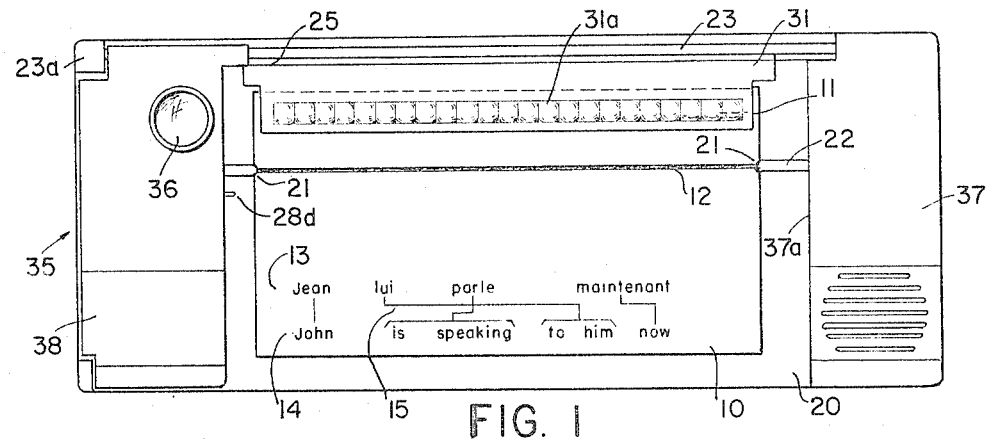

Dec. 6, 1966 W. K. BENDER 3,289,326
AUDIO-VISUAL TEACHING MATERIAL AND APPARATUS
FOR PREPARING SUCH MATERIAL
Original Filed Nov. 22, 1961 5 Sheets-Sheet 1

INVENTOR.
WERNER K. BENDER
BY
ATTORNEYS

INVENTOR.
WERNER K. BENDER

INVENTOR.
WERNER K. BENDER

Dec. 6, 1966 W. K. BENDER 3,289,326
AUDIO-VISUAL TEACHING MATERIAL AND APPARATUS
FOR PREPARING SUCH MATERIAL
Original Filed Nov. 22, 1961 5 Sheets-Sheet 4

INVENTOR.
WERNER K. BENDER
BY Hane and Nydick
ATTORNEYS

Dec. 6, 1966  W. K. BENDER  3,289,326
AUDIO-VISUAL TEACHING MATERIAL AND APPARATUS
FOR PREPARING SUCH MATERIAL
Original Filed Nov. 22, 1961   5 Sheets-Sheet 5

INVENTOR.
WERNER K. BENDER
BY
ATTORNEYS

United States Patent Office 3,289,326
Patented Dec. 6, 1966

3,289,326
AUDIO-VISUAL TEACHING MATERIAL AND APPARATUS FOR PREPARING SUCH MATERIAL
Werner K. Bender, Plainville, Conn., assignor to The Kalart Company Inc., Plainville, Conn.
Original application Nov. 22, 1961, Ser. No. 154,294. Divided and this application July 29, 1965, Ser. No. 478,023
7 Claims. (Cl. 35—35)

The present invention relates to teaching material on which visual and audio information is coordinated, and more particularly to teaching material consisting of sheets upon which visual information in the form of letters or symbols and audio information in the form of a sound track are reproduced. The sheets may be kept loose or in binders, be placed in a container or bound in a book.

This application is a division of application Serial No. 154,294, filed November 22, 1961 and now abandoned.

Teaching material of this kind, sometimes referred to as "talking books," may be used for teaching, for example, a foreign language, by providing on a sheet a word of sequence of words in one language and a translation thereof into a foreign language and a recording of the word of words in the foreign language. A student then has before him the words of his own language and in the foreign language, and simultaneously with reading he can listen to the correct pronunciation of the words. The coordination of audio and visual information on the teaching sheet may be used also to teach a student elocution in his own language, or music, by providing notes and a recording of the sound values of the notes.

Teaching material of the kind above referred to affords, among others, the advantage that one teacher can efficiently supervise and assist many more students than heretofore has been possible, and each student can proceed at his own pace.

The invention also relates to apparatus for making visually and aurally available to the student the information contained on the teaching material.

The invention further relates to apparatus for producing the afore-described material.

It is one of the broad objects of the invention to provide teaching material in sheet form upon which visual and audio information is provided and arranged in a novel and improved fashion.

A more specific object of the invention is to provide novel and improved teaching material upon which both the visual and the audio information is reproduced by printing, such as offset or letter-press printing, by means of a conventional press and by the use of conventional printing techniques, the audio information being provided by printing a variable-area type sound track with magnetically conductive ink, that is, an ink having magnetic recording properties.

Another more specific object of the invention is to provide novel and improved teaching material on which the visual information in the form of sequences or phrases of words in different languages is indexed by lead lines to indicate to the student the positions of the corresponding words in the same sentence or phrase rendered in different languages.

Another more specific object of the invention is to provide novel and improved teaching material on which visual information in the form of words or phrases is coupled with pictorial representations of the lip movements of a person uttering the respective words, thereby assisting the student in learning the correct pronunciation of those words.

It is also a broad object of the invention to provide novel and improved apparatus for reproducing audio information recorded on teaching material according to the invention, while simultaneously the aforementioned lip movements may be observed in a manner such that the images of the lips appear actually to move, somewhat in the manner of images projected from a motion picture film.

It is a further broad object of the invention to provide novel and improved apparatus for producing a printing plate, such as a zinc plate, upon which are combined the audio and visual information to be reproduced on the teaching material. Such plate may then be used to print, by means of conventional printing presses and conventional printing techniques, the combined information upon paper or other conventional material, in the same manner as any other material may be printed, thus making it possible to produce the teaching material according to the invention by standard mass production techniques.

Other and further objects, features and advantages of the invention will be pointed out hereinafter and set forth in the appended claims constituting part of the application.

In the accompanying drawing, preferred embodiments of the invention are shown by way of illustration, and not by way of limitation.

Figure 2:
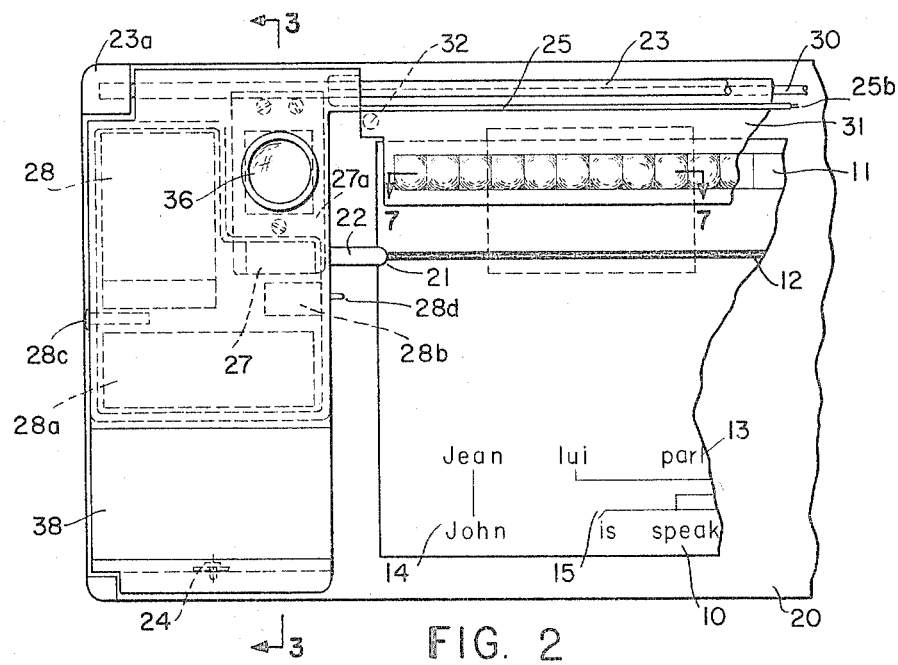
Figure 3:
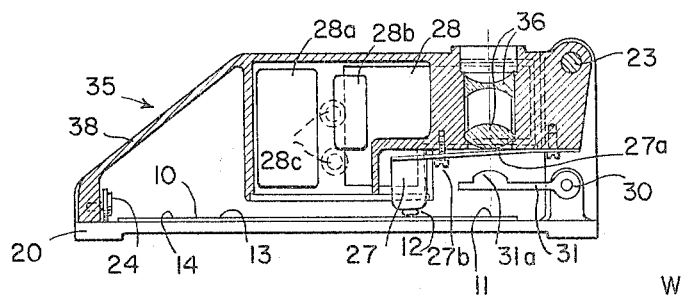
Figure 5:
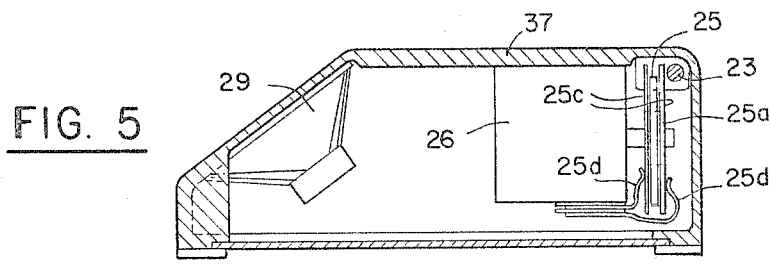
Figure 4:
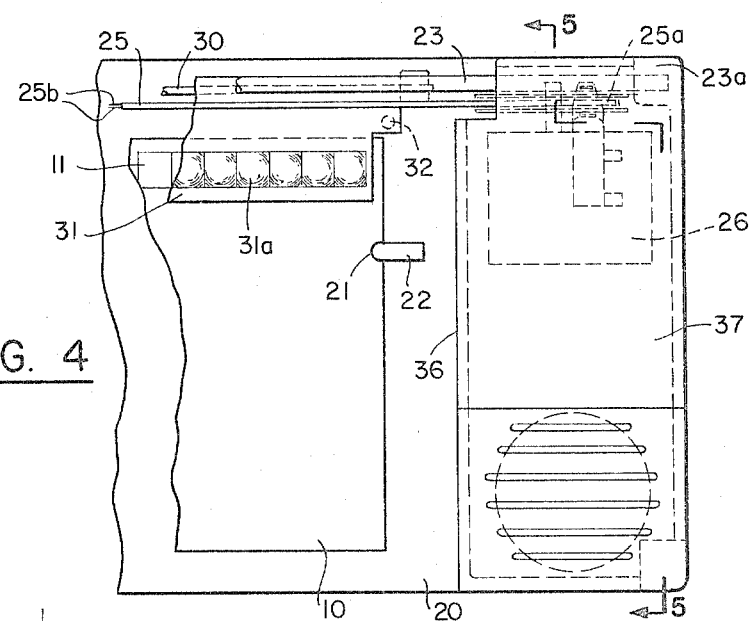
Figure 6:
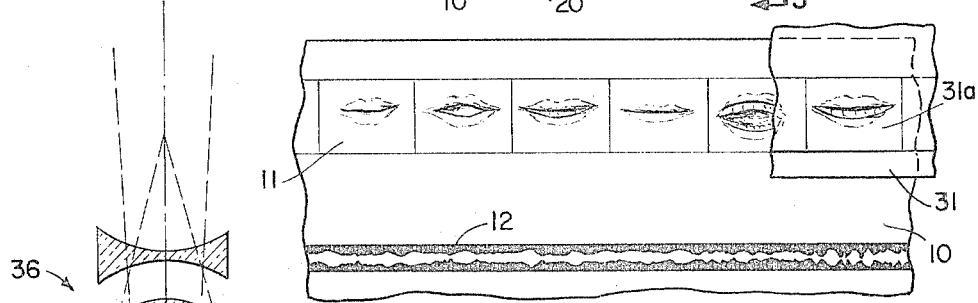
Figure 7:
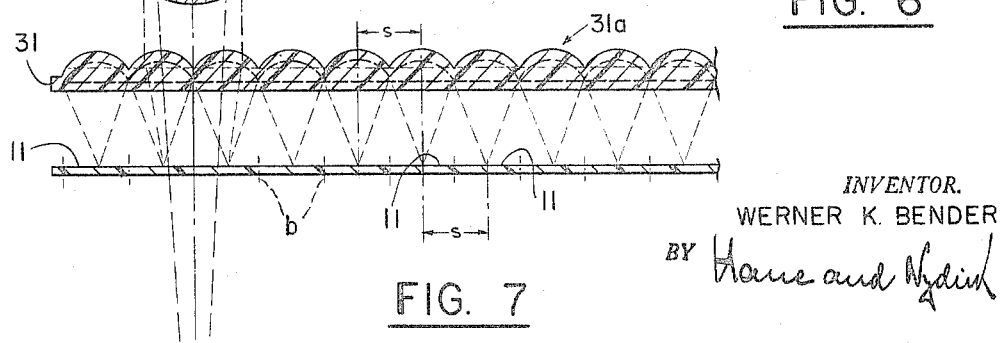
Figure 14:
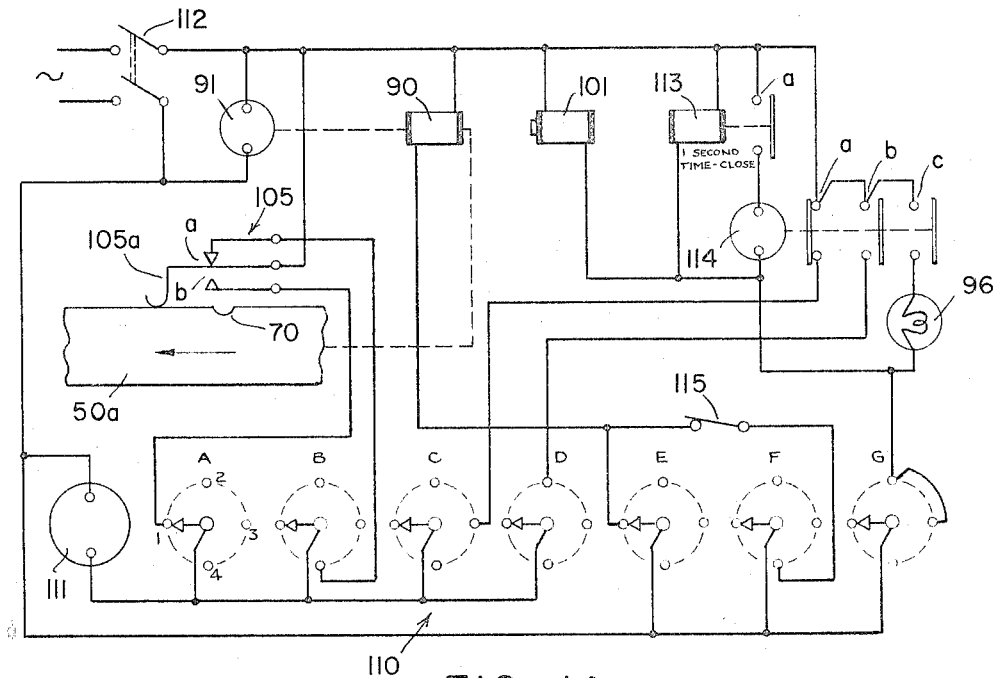
Figure 8A:
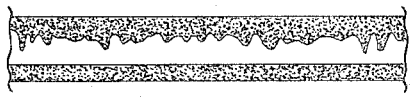
Figure 8B:
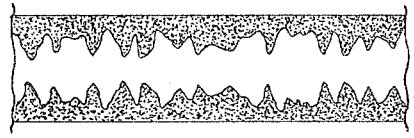
Figure 8C:
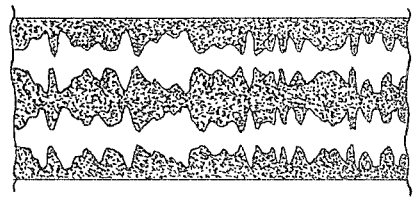
Figure 9:
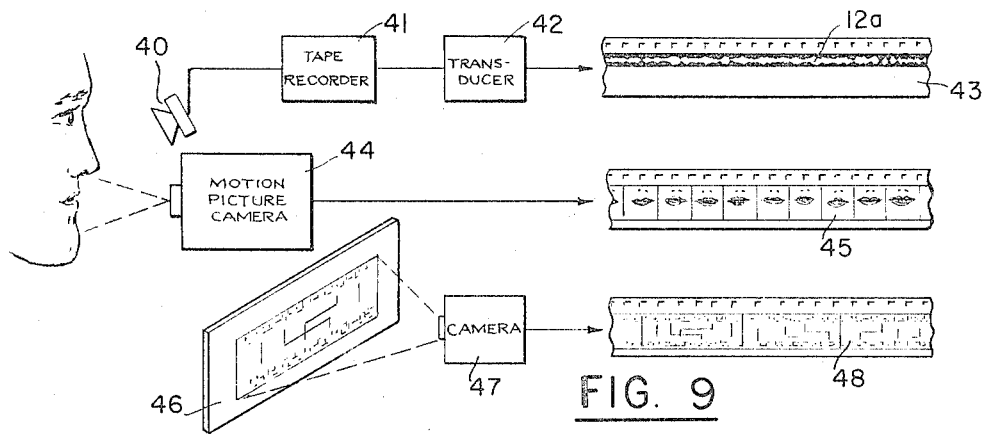
Figure 10:
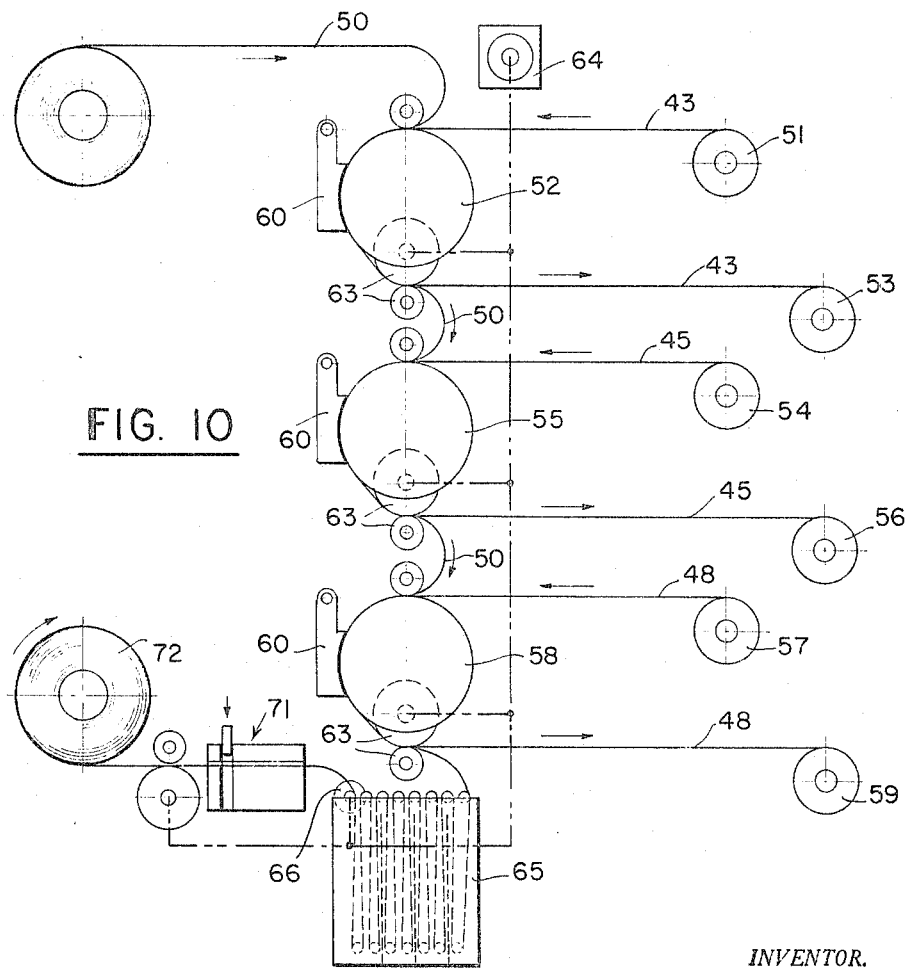
Figure 11:
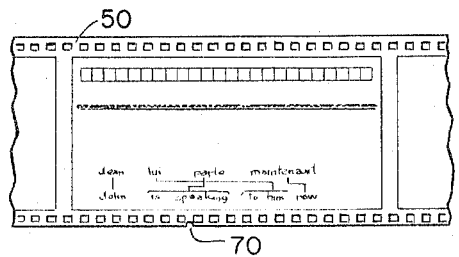

In the drawing:
FIG. 1 is a plan view of a sheet of teaching material and an apparatus for making such material visually and aurally available to a student;
FIG. 2 is an enlarged plan view of the left portion of FIG. 1;
FIG. 3 is a sectional elevational view taken along line 3—3 of FIG. 2;
FIG. 4 is an enlarged plan view of the right portion of FIG. 1;
FIG. 5 is a sectional elevational view taken along line 5—5 of FIG. 4;
FIG. 6 is a fragmentary enlarged view of a portion of FIG. 2 indicated thereon by dotted lines;
FIG. 7 is a sectional plan view taken along lines 7—7 of FIG. 2;
FIGS. 8a, 8b and 8c are diagrammatic view of variable-area type sound tracks, such as may be used in connection with teaching material according to the invention;
FIG. 9 is a diagrammatic view of an apparatus for recording on three strips of film audio and visual information to be used in connection with the teaching material of the invention;
FIG. 10 is a diagrammatic view of a printing machine for combining the information contained on the three films of FIG. 9 on a single strip of film;
FIG. 11 is a plan view of a portion of the film strip obtained with the printing machine of FIG. 10;
FG. 12 is a diagrammatic view of an apparatus for transferring the information contained on the film according to FIG. 11 onto a printing plate;
FIG. 13 is a detailed view of FIG. 12 taken on line 13—13 on an enlarged scale; and
FIG. 14 is a circuit diagram of automatic cycling means for the apparatus according to FIG. 12.

Referring now to the figures in detail, and specifically first to FIGS. 1, 2, 3, 5 and 6, these figures show a sheet 10. The sheet may be of paper, but it may also be made of a more durable material, such as a suitable plastic. There are printed on the sheet, in a manner which will be more fully described hereinafter, four rows of information, starting from the top: a row of longitudinally spaced illustrations or picture elements 11 of lip movements; a sound track 12; a sentence 13; and a sentence 14. Sentence 13 is printed in the language to be learned, in this example the French language, and sentence 14 in the known language, in this example the English language. Lead lines 15 index the corresponding words in the two languages.

The row of lip movements is shown in FIG. 6 in greater detail and on an enlarged scale. This figure also shows sound track 12 on an enlarged scale and in greater detail. Variable-area sound tracks, which may advantageously be used in connection with the invention, are further shown in detail in FIGS. 8a, 8b and 8c. FIG. 8a shows a unilateral variable-area sound track, FIG. 8b a bilateral variable-area sound track, and FIG. 8c a multi-track recording.

In FIG. 1 the afore-described audio and visual information is shown as occupying substantially the entire area of sheet 10. However, several sets of information as shown in FIG. 1 may be printed on a single sheet. The order of the rows as shown in FIG. 1 may of course be change in any desired manner.

The student should be visualized as having available a collection of sheets 10. The information contained thereon may represent a continuing story, or it may progress from sheet to sheet in difficulty. As is readily apparent, the information contained on the sheets may be selected as seems best for the purpose to be served by the teaching material.

In the event a teaching sheet such as is shown in FIG. 1 is to be used for teaching elocution, words in one language only would have to be printed, and if the teaching sheet is to be used to teach music, the printed words on the sheet would be replaced by notes.

FIGS. 1 to 5 further show a device for making conveniently available to the student the information contained on the sheet. The device comprises a base plate 20 on which the sheet is suitably located, for instance, by punching notches 21 in the sheet, which are fitted upon the ends of locating bars 22 raised above the base plate 20. The base plate mounts a transverse bar 23 supported at each end by portions 23a protruding upwardly from base 20. The base plate further mounts a bar 30 to which is hinged a strip 31 made of suitable transparent material, such as plastic. The strip has a lenticulated surface 31a and in the position shown in FIG. 1 overlies the pictorial illustrations of lip movements shown in row 11. It is maintained at the proper spacing to the illustration by studs 32. The strip may be tilted up to facilitate placement of a sheet 10 upon the base plate.

A carriage 35 is supported slidably on bar 23 at one end and on roller 24 at its other. A flexible belt 25 connected at one end to the carriage is attached at its other end to a grooved pulley 25a which is in turn driven by a motor 26 in a housing 37. Operation of the motor and rotation of the pulley draw the carriage from left to right across sheet 10 at a substantially uniform speed. Although motor 26 can be of any known electrical or mechanical type the preferred drive motor is one which utilizes a pre-stressed spring which winds and unwinds on two spaced pulleys and produces a substantially uniform torque. A suitable governor such as an air vane, not shown, may be provided practically to eliminate non-uniformity of speed. In use, carriage 35 is slid manually from its normal resting position at the right end of the apparatus against the action of the spring motor to the wound position at the left as shown in FIGS. 1 and 2 and then released. A ratchet or spring clutch associated with motor 26 permits overriding the governor during winding of the spring to insure easy action. An analogous arrangement can be employed with an electric motor drive, should the latter be more desirable.

The carriage incorporates an optical system 36 coacting with lenticulated surface 31a and so designed that to an observer viewing the lenticulated surface and row 11, the lips shown in detail in FIG. 6 appear to move from one position to the other in a manner similar to conventional motion pictures as the optical system is driven along row 11. The principle of the operation is shown in FIG. 7. Each lens portion 31a is positioned at the distance of its focal length from and centered upon one of the picture elements 11, the edges of which are indicated at b. The spacing $s$ between the centers of the lens elements is equal to the spacing $s$ between the centers of the picture elements. Optical system 36 is afocal, or substantially so, and acts as a Galilean telescope. In the resulting overall system, corresponding portions of adjacent picture areas as seen through optical system 36 appear to coincide at those portions where they overlap. The moving image is made to appear at some convenient distance below the optical system, as for example 10 to 15 inches in order to permit comfortable viewing. Optical systems and lenticulated surfaces creating an optical illusion of this kind are well known in the art and widely used, for instance, for advertising purposes.

Carriage 35 further mounts a magnetic sound head 27, which should be visualized as being connected to conventional amplifying and loudspeaking circuit components, and which serves to scan for reproduction the sound recorded on track 12. For this purpose a preferably miniaturized amplifier 28 is contained in carriage 35, although it could be attached elsewhere on or adjacent the apparatus. Power is supplied by a battery 28a through a switch 28b and the output of the amplifier can be connected to head phones or a remote speaker, not shown, through sockets 28c, or transmitted through wires 25b in belt 25 to a built-in speaker 29. The electrical path in the latter case is provided through flanges 25c of pulley 25a. Flanges 25c are insulated from each other and from the motor shaft. Each flange is connected to one of wires 25b and is in turn contacted by a brush 25d. Speaker 29 connects to lugs on brushes 25d through wiring, not shown. Sound head 27 is yieldably supported on a spring yoke 27a which permits the head to move a small distance vertically without lateral displacement from the sound track on which it rides. Effective contact between the head and the track is achieved by the weight of the head, although spring means may be employed to urge the head downward if required. An adjustable stop screw 27b cooperates with spring 27a to prevent excessive motion, particularly when the carriage is swung upwardly for cleaning, maintenance and battery replacement. Sound head 27 normally rests upon bars 22 when at either end of the apparatus and is lifted by these bars to the level of the top side of sheet 10 in order to prevent jamming of the head or damage to the edge of the sheet during the travel of head to and from its position of rest. Switch 28b has an operating plunger 28d which projects outwardly as shown in FIG. 2 and opens the circuit to amplifier 28 when pressed against wall 37a of housing 37 by carriage 35. When the carriage is moved to the left or wound position, the switch closes and energizes amplifier 28. This arrangement extends battery life.

A transparent window 38 made of plastic or glass preferably integral with the body of carriage 35, which is preferably made of plastic or metal, is provided to permit reading and comparing of the English and French sentences printed on the sheet.

FIG. 9 shows equipment suitable for preparing a printing plate from which teaching sheets 10 may be printed. The equipment according to FIG. 9 comprises a microphone 40 which picks up the voice of a speaker and feeds it to a tape recorder 41. Recorder 41 is connected to a transducer 42 including tape playback means and optical modulating means of suitable and conventional design. The output of the transducer serves to record a sound track 12a on a film 43. The sound track is preferably recorded as a variable-area type magnetic sound track. The lip movements of the speaker when uttering the words recorded on sound track 12 are photographed by a motion picture camera 44 upon a second film strip 45 to produce the pictorial representations shown in FIG. 6. Finally, a board or other base 46 upon which are printed the words and the lead lines shown in FIG. 1 is photographed by a camera 47 upon a third film 48.

The three negative films 43, 45 and 48 thus produced are combined on a positive film 50 by means of a contact printer such as is diagrammatically shown in FIG. 10. A contact printer of that kind and suitable for the purpose is more fully shown and described in copending application Serial No. 30,314, filed May 19, 1960, by John A. Maurer and issued as Patent 3,094,057 on June 18, 1963. The film 43 is fed from a supply reel 51 over a printing drum 52 to a take-up reel 53. Similarly, film 45 is fed from a supply reel 54 over a printing drum 55 to a take-up reel 56, and film 48 is fed from a supply reel 57 over a printing drum 58 to a take-up reel 59. Film 50 to be printed upon is guided over successive printing drums. Thus, successive portions of film 50 are superimposed upon corresponding portions of films 43, and 45 and 48 while film 50 passes over the peripheries of the drums. Pivotal clamps 60 serve intermittently to press the superimposed portions of the films against the peripheries of the drums during the printing operations and to release the films for transport upon completion of the printing operations. The printing drums and the films should be visualized as being driven by gear train 63, which in turn is driven by common drive means 64. The printing drums should be visualized as each including a picture gate, and as including the required light sources and optical components for effecting printing of the negative films upon film 50.

The drive of the printing drums and the films is intermittent, as already mentioned. The control of the intermittent drive and also of the movements of clamps 60, alternating between the release position and the clamping position, is effected by suitable cycling means. These means do not constitute part of the invention, and hence are not shown in detail. They are fully disclosed in the aforementioned copending patent application.

Film 50 as it emerges from printing drum 58 has printed thereon longitudinally spaced groupings of the composite visual and audio information shown in FIG. 1. The film is developed, fixed, washed and dried in any suitable film processor 65, driven synchronously through ears 66. FIG. 11 shows a portion of film 50, each frame representing a grouping of the composite information. The finished master positive film 50 may be fed to a film notching device 71 in which each frame of the film receives a marginal notch 70 for a signal function to be explained hereinafter. The film is then taken up on storage reel 72 for future use.

Master positive film 50 is used to prepare a corresponding working negative film. This film is used in turn to prepare a printing plate from which teaching material such as is shown in FIG. 1 may be printed on conventional presses by conventional printing techniques. Printing of the sheet may be effected by using magnetically conductive ink for the entire sheet or magnetically conductive ink for the sound track and printer's ink for other portions of the sheet.

Figure 12:
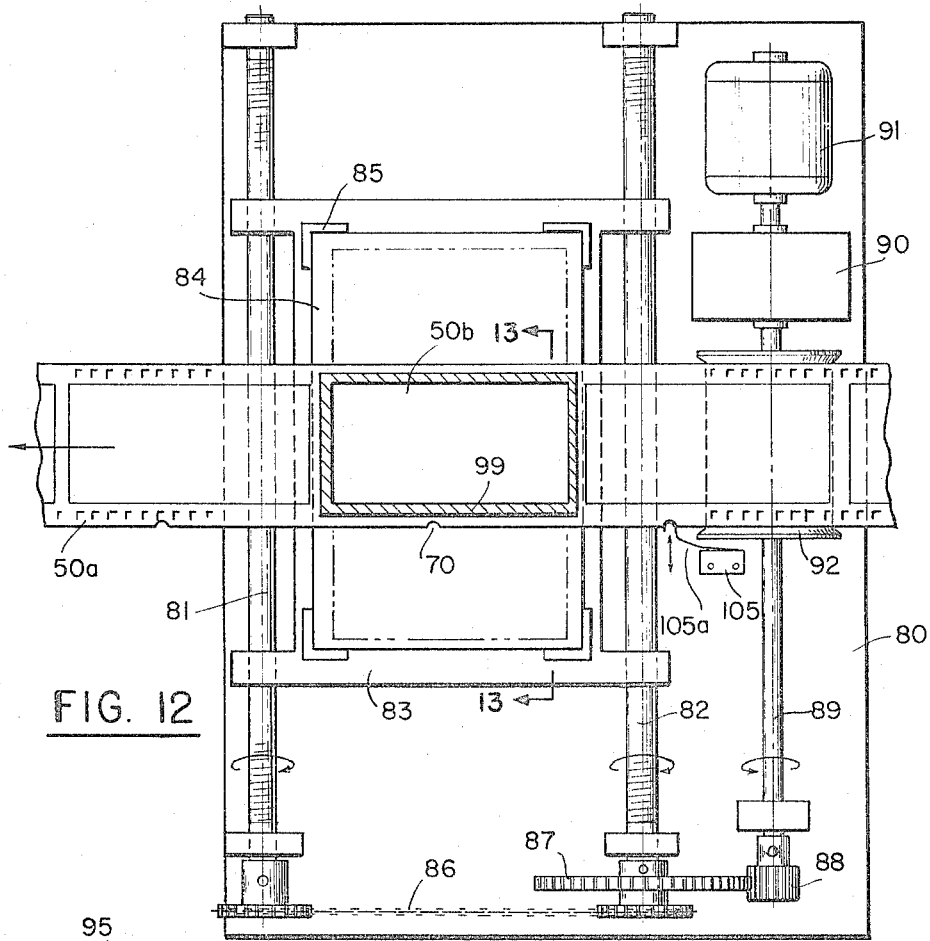
Figure 13:
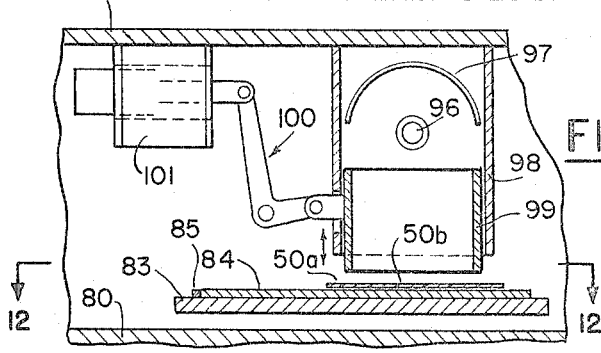

FIGS. 12, 13 and 14 show apparatus suitable for the purpose of printing from a continuous negative film 50a made from film 50. The apparatus as shown in FIGS. 12, 13 and 14 comprises a base plate 80 on which are rotatably mounted two threaded bars 81 and 82 parallel to each other. Bars 81 and 82 support in threaded engagement a frame 83, so that upon rotation of bars 81 and 82 frame 83 will travel along a rectilinear path with reference to base 80. In FIG. 12 it is assumed that frame 80 travels downwardly. The frame serves to receive a light-sensitized plate 84, such as a light-sensitized zinc plate. The plate is located by any suitable means, such as angles 85, so that it will participate in a displacement of frame 83. Bars 81 and 82 are coupled by suitable transmission means, such as a chain belt 86, and bar 82 mounts a gear 87 in mesh with a pinion 88 on a drive shaft 89 rotatably mounted on base 80. Shaft 89 can be coupled by an electromagnetic coupling 90 to a motor 91 and seats a sprocket 92 with which film 50a is metered across the apparatus to a take-up reel, not shown. As is apparent, rotation of shaft 89 will displace plate 84 and will also drive film 50a across the plate transverse to the direction of movement thereof. The ratio of the rate of transport of the plate and the film is determined by selected gear ratios, and the correlation of the timing of the relative movements is controlled by the circuit system shown in FIG. 14, which will be described hereinafter.

In FIG. 12 it is indicated by dotted lines that three groupings or frames of information such as shown in FIGS. 1 or 11 are printed on the same plate. A greater number of groupings may be printed on a correspondingly larger plate if desired. However, it may also be visualized that instead of one large plate 84, several smaller printing plates are supported. Each of the small plates may then have the shape shown for the individual images in FIG. 12. In any event, only one grouping 50b is printed upon the plate at one time. For this purpose the part of the printing plate 84 to be printed upon or to be protected from fogging is enclosed in a light-tight housing 95, part of which is shown in FIG. 13. Housing 95 also accommodates a source of light 96 of suitable design. The source of light may be an incandescent bulb, a fluorescent bulb or an arc light, depending upon the specific requirements of the apparatus. The source of light preferably with a suitable reflector 97 is housed in a light-tight sleeve 98 in which is telescoped a second light-tight sleeve 99. Sleeve 99 may be moved from the illustrated raised position, in which film 50a is released for transport, to a lowered position in which the film is clamped upon plate 84 for the purpose of contact printing. The position of sleeve 99 is controlled by a linkage 100, which in turn is controlled by the state of energization of a solenoid 101.

The transport of frame 83 and film 50a, the illumination of the source of light 96 and the energization of solenoid 101 are controlled by a switch 105, from which extends a feeler arm 105a engageable with film notches 70. The circuitry for control of the functioning of the apparatus according to FIGS. 12 and 13 is shown in FIG. 14. In this figure the circuit components referred to in the previous description are designated by the same numerals, although only diagrammatically shown. The control of the circuit connections is effected by a stepping switch 110 of conventional design and shown in a conventional manner. The stepping switch is designed for four steps. It comprises an actuating relay 111 and seven control disks designated A to G. Assuming that feeler arm 105a is disengaged from notch 70, as shown, and that main switch 112 is closed, motor 91 is energized and runs, and electromagnetic clutch 90 also is energized through stepping switch disk E. As may be noted, all the contact arms are shown in the step 1 position. Accordingly, both frame 83 and film 50 are driven. When now notch 70 reaches feeler arm 105a, switch 105 opens its a contact and closes its b contact. As a result, actuating relay 111 is energized, and the stepping switch steps all its contact arms into the position 2. In this position, electromagnetic clutch 90 is de-energized and solenoid 101 is energized through switch disk G and moves sleeve 99 into its clamping position. Furthermore, a time-delay relay 113 is energized through disk G. This relay has a suitable delay time, such as one second, and serves to permit sleeve 99 sufficient time to move into its clamping position. Relay 113 at the end of its delay time closes its contact a. As a result, a timer 114 is energized through disk G. Timer 114, when energized, immediately opens its a contacts and closes its b and c contacts. The timer is arranged to maintain its contacts in the aforesaid positions for a predetermined period of time, which is selected according to the period of time required for the exposure of plate 84, and which may be as long as several minutes in the event a zinc plate is used.

Closing contacts c closes the energizing circuit for lamp 96 through disk G, and closing contacts b completes an energization circuit for actuating relay 111 through switch disk D. Accordingly, the stepping switch now steps to position 3. At the end of the delay time of timer 114, contacts b and c are opened and contacts a are reclosed. Accordingly, lamp 96 is extinguished, and relay 111 is energized through disk C, thereby stepping the stepping switch into position 4. In this position, clutch 90 is re-energized through disk F, whereby transport of the film and the plate are resumed, motor 91 being energized as long as switch 112 is closed. As a result, feeler arm 105a is lifted out of notch 70. This causes the stepping switch to home into its position 1, whereby the afore-described cycle is repeated.

A switch 115 is connected in parallel to the No. 1 position of disk E and the No. 4 position of disk F. If switch 115 is normally left open and temporarily closed, the apparatus will pulse one cycle, as hereinbefore described. Switch 115 may, for instance, be a push button switch.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An apparatus for use in connection with teaching material in sheet form having printed thereon at least one word in two languages and a recording of said word in one of said languages, said apparatus comprising a flat base for placing thereupon a sheet of said teaching material; guide means mounted on said base; a scanning device slideably guided on said guide means along said recording for coaction therewith and including a housing, a battery, a magnetic sound head and an amplifier; said battery, sound head and amplifier being fixedly mounted within said housing; a loudspeaker; circuit means including said battery, said sound head, said amplifier and said loudspeaker; control switch means included in said circuit means for controlling the activation thereof; and drive means for moving said housing along said guide means from a starting position at the beginning of said recording to an end position at the end of said recording, said housing coacting with said switch means to open the switch means when the housing is in said end position and to close the same when the housing is in said starting position and while travelling toward said end position, closing of said switch means activating said circuit means for audible reproduction of the recording.

2. An apparatus according to claim 1 wherein said drive means comprise a belt drive coupled with said housing for moving the same from the starting position to the end position, and wherein said circuit means include wire conductors lengthwise secured to said belt drive, said wire conductors connecting the loudspeaker with the amplifier, the sound head and the battery in the housing.

3. An apparatus for use in connection with teaching material in sheet form having printed thereon in parallel rows of sequence of words, pictorial representations of lip movements indicative of an oral rendering of said words and a sound recording of said words, said apparatus comprising a flat base plate for supporting thereon a sheet of teaching material, coacting means on the plate for placing the sheet in a predetermined position on the plate, a transparent strip having a lenticular surface overlying said pictorial representations, guide means mounted on said base, a scanning and viewing device slidable on said guide means parallel to said rows, said device including a magnetic sound head for coacting with said recording and optical lens means coacting with said lenticular surface to produce apparently animated images of the lip movements, and drive means for driving said device along said guide means.

4. An apparatus according to claim 3 wherein said scanning device comprises a housing, a battery, an amplifier and a loudspeaker, said battery, amplifier and sound head being mounted within said housing and said loudspeaker being stationarily mounted spaced apart from the housing, circuit means connecting said battery, said amplifier, said sound head and said loudspeaker in circuit, and control switch means included in said circuit, and wherein said drive means drives said scanning device from a starting position at the beginning of the recording to an end position at the end of the recording, said housing coacting with said switch means to open the same when the scanning device is in said end position and to close said switch means when the scanning device is respectively in said starting position and travelling towards the end position, closing of the switch means activating said circuit means.

5. An apparatus according to claim 4 wherein said drive means comprise a belt drive coupled with the scanning device for driving the same from the starting position to the end position, and wherein said circuit means include wire conductors lengthwise secured to said belt drive, said wire conductors connecting the loudspeaker to the amplifier, the battery and the sound head in the housing.

6. An apparatus according to claim 3 and comprising yieldable mounting means supporting said sound head transversely yieldable in reference to said base plate.

7. An apparatus according to claim 6 wherein raised portions are provided on said base plate adjacent to the beginning and then end of a recording on a sheet located on the base plate, said raised portions supporting the sound head in positions of non-scanning thereof to lift the sound head to approximately the level of a sheet on the base plate thereby preventing jamming of the head and damage to the sheet when the sound head engages the same.

References Cited by the Examiner

UNITED STATES PATENTS

| | | | |
|---|---|---|---|
| 2,019,929 | 11/1935 | Pupke | 95—75 |
| 2,548,011 | 4/1951 | Frost | 35—35 |
| 2,603,006 | 7/1952 | MacChesney | 35—35 |
| 2,849,542 | 8/1958 | MacChesney | 35—35.3 X |
| 2,936,342 | 5/1960 | Kallmann | 35—35.3 X |
| 2,943,553 | 7/1960 | Drewett | 95—75 |
| 3,026,634 | 3/1962 | Irazoqui | 35—35.3 |

OTHER REFERENCES

A.P.C. 386,191, Vignal (Alien Property Custodian).

EUGENE R. CAPOZIO, *Primary Examiner.*

W. GRIEB, *Assistant Examiner.*